(12) United States Patent
Lüders

(10) Patent No.: US 6,201,819 B1
(45) Date of Patent: Mar. 13, 2001

(54) PROCESS FOR TRANSMITTING DATA PACKETS FROM MOBILE STATIONS TO BASE STATIONS IN MOBILE RADIO SYSTEMS OPERATED ON THE TIME MULTIPLEX SYSTEM

(75) Inventor: Christian Lüders, Haar (DE)

(73) Assignee: Siemens AG (DE)

( * ) Notice: Subject to any disclaimer, the term of this patent is extended or adjusted under 35 U.S.C. 154(b) by 0 days.

(21) Appl. No.: 09/043,161

(22) PCT Filed: Sep. 3, 1996

(86) PCT No.: PCT/DE96/01640

§ 371 Date: Mar. 12, 1998

§ 102(e) Date: Mar. 12, 1998

(87) PCT Pub. No.: WO97/10685

PCT Pub. Date: Mar. 20, 1997

(30) Foreign Application Priority Data

Sep. 14, 1995 (DE) .............................................. 195 34 156

(51) Int. Cl.[7] ...................................................... H04J 3/06
(52) U.S. Cl. .......................... 370/508; 370/280; 370/324; 342/88
(58) Field of Search ................................... 370/242, 252, 370/280, 320, 321, 324, 335, 337, 330, 342, 508; 375/225, 226, 227; 342/88

(56) References Cited

U.S. PATENT DOCUMENTS

| | | | | |
|---|---|---|---|---|
| 3,742,498 | * | 6/1973 | Duun ........................................ | 342/88 |
| 5,295,152 | * | 3/1994 | Gudmundson et al. ............. | 370/342 |
| 5,301,188 | * | 4/1994 | Kotzin et al. ......................... | 370/330 |
| 5,802,105 | * | 9/1998 | Tiedemann, Jr. et al. ........... | 375/225 |
| 5,959,980 | * | 9/1999 | Scott .................................... | 370/280 |

FOREIGN PATENT DOCUMENTS

| | | | | |
|---|---|---|---|---|
| 40 11 341 A1 | 10/1991 | (DE) | ................................ | H04J/3/00 |
| 0 533 636 A2 | 1/1993 | (EP) | ................................ | H04B/7/26 |
| 2 277 232 | 10/1994 | (GB) | ................................ | H04B/7/212 |
| WO 94/05094 | 3/1994 | (WO) | ................................ | H04B/7/24 |

* cited by examiner

Primary Examiner—Douglas W. Olms
Assistant Examiner—Shick Hom
(74) Attorney, Agent, or Firm—Bell, Boyd & Lloyd LLC

(57) ABSTRACT

A process for the transmission of data packets from mobile stations to base stations in mobile radio systems operated by the time-division multiplex method where an effective utilization of resources and a reduced amount of signalling is achieved in the transmission of such data packets by the fact that the determination of the timing advance for the time of sending of the mobile station is linked to the satisfying of decision criteria with respect to the period of time between timing advance determinations. This period of time can be made relatively generous by transmitting the data packets with a short guard time.

8 Claims, 2 Drawing Sheets

PROCESS FOR TRANSMITTING DATA PACKETS FROM MOBILE STATIONS TO BASE STATIONS IN MOBILE RADIO SYSTEMS OPERATED ON THE TIME MULTIPLEX SYSTEM

BACKGROUND OF THE INVENTION

1. Field of the Invention

The present invention relates to a process for transmitting data packets from mobile stations to base stations in mobile radio systems operated by the time-division multiplex method.

2. Description of the Prior Art

For the transmission of data between two communication terminals, recourse can be made to connection-oriented concepts and concepts based on virtual (logical) links. In the case of connection-oriented data transmissions, physical resources have to be provided between the two communication terminals during the entire time of the data transmission.

In the case of data transmission via logical links, the permanent provision of physical resources is unnecessary. An example of such data transmission is packet data transmission. Here, a logical link between the two communication terminals exists during the entire duration of the data transmission, but physical resources are provided only during the actual transmission times of the data packets. This process is based on the fact that the data is sent in short data packets, between which longer pauses can occur. In the pauses between the data packets, the physical resources are available for other logical links. With respect to one logical link, physical resources are saved.

The packet data transmission process is suitable in particular for communication systems with limited physical resources, whenever short data packets have to be transmitted only sporadically. For example in mobile radio systems, such as the GSM mobile radio system, the physical resources are restricted in terms of frequency range (number of frequency channels) and time slots. Accordingly, such physical resources have to be used efficiently.

The GSM mobile radio system operates by the time-division multiplex method, with the result that time slots within a frequency channel can be divided between various communication terminals. In a communication relationship between a base station, which is further connected to a communication network, and a mobile station, it must be ensured that the information items sent by the various mobile radio stations arrive in the base station in conformity with the time slots. Since the distance, and consequently the delay, between mobile station and base station may well differ and/or changes if the mobile station moves, it is necessary to calculate a timing advance which influences the time of sending for the respective time slot in the mobile station.

The GSM system was conceived for voice transmission. In a voice transmission, information items are constantly exchanged between mobile station and base station. There is, therefore, no difficulty in determining the timing advance sufficiently frequently on the basis of the constantly exchanged information items.

However, the amount of signalling which voice transmission involves, and which can be used also for the determination of the timing advance, is inappropriately high, for packet data transmission. A process for packet data transmission in which the timing delay is determined before each transmission of the data packet is known from Telia AB/Telia Research, from the GPRS Conference from 10 to Jan. 12, 1995. As emerges from page 8, items 3 and 4 of the updating procedure, the mobile station sends an access data packet on an access channel GACH, whereupon the base station determines the timing advance and sends the determined timing advance to the mobile station via an acknowledgement channel GCCH. The timing advance must consequently still be determined relatively frequently. Also, accesses to the access channel and acknowledgement channel are necessary in this case, or these channels have to be separately provided.

SUMMARY OF THE INVENTION

The present invention is directed toward reducing the amount of signalling in packet data transmission in mobile radio systems.

The process according to the present invention utilizes the fact that a mobile station moves towards or away from the base station usually only at low speeds. Consequently, the signal delay between mobile station and base station also changes only gradually, with the result that no abrupt changes to the timing advance are necessary. In view of this fact, the determination of the timing delay can be linked to the satisfying of certain decision criteria. Such criteria relate to the period of time between timing delay determinations if the transmission of the data packets is performed with a small guard time, i.e., the guard time is less than the maximum permissible signal delay between mobile station and base station.

The guard time is, by definition, the time between the end of a transmitted data packet and the end of the associated time slot. It ensures that, if there is a small discrepancy between the arrival of the data packet and the pattern of the time slots of the base station, a collision of the data packets of two time slots cannot occur. For example, for a GSM system this means that, with a small guard time of, for example, 8.25 bits (about 30 $\mu$s) and a mobile station moving away from the base station at 36 km/h, once a timing advance has been set it does not lead to any collision of data packets for up to 7 minutes, even without any correction.

A guard time of 10 to 50 $\mu$s in a time slot in the GSM system at the same time also represents an efficient sharing of the resource of time. The relatively long period of time during which data packet collisions are avoided by the timing delay, once it has been set, can be used to achieve the effect that the decision criteria are satisfied only by the end of a period which can be set by means of parameters. Irrespective of the data packets actually sent, the timing advance is recalculated, and the mobile station is set to it, only at relatively great intervals. The amount of signalling is in this case small and no additional delay occurs before the transmission of a data packet.

As an alternative to this, the decision criteria may also be satisfied by the fact that, when sending a data packet, and the last determination of the timing advance was a predetermined period of time before A specifically set period is in this case replaced by testing, before each sending of a data packet, whether only a tolerable period of time has elapsed since the last determination of the timing advance. Under certain circumstances, the frequency of the determination of the timing advance may be additionally restricted, but an additional checking effort is necessary before each sending of a data packet.

The test packet of which the arrival at the base station is used as a basis for determining the timing advance advantageously contains an identification which indicates that only the timing advance is to be determined. The base station recognises from this that from then on no technical radio resources have to be assigned. It is also possible to dispense with additional signallings when sending the determined timing delay if the confirmation of reception of data packets is also used for sending the said timing advance.

Further advantageous refinements of the process according to the present invention may also be realized. In particular, the process according to the present invention is suitable for use in GSM mobile radio systems, whereby applications such as a mobile office with E-mail, fax, file transfer, point-of-sale implementations, fleet management, traffic control systems and other similar applications can be realised.

Additional features and advantages of the present invention are described in, and will be apparent from, the Detailed Description of the Preferred Embodiments and from the Drawings.

DETAILED DESCRIPTION OF THE PREFERRED EMBODIMENTS

Figure 1:
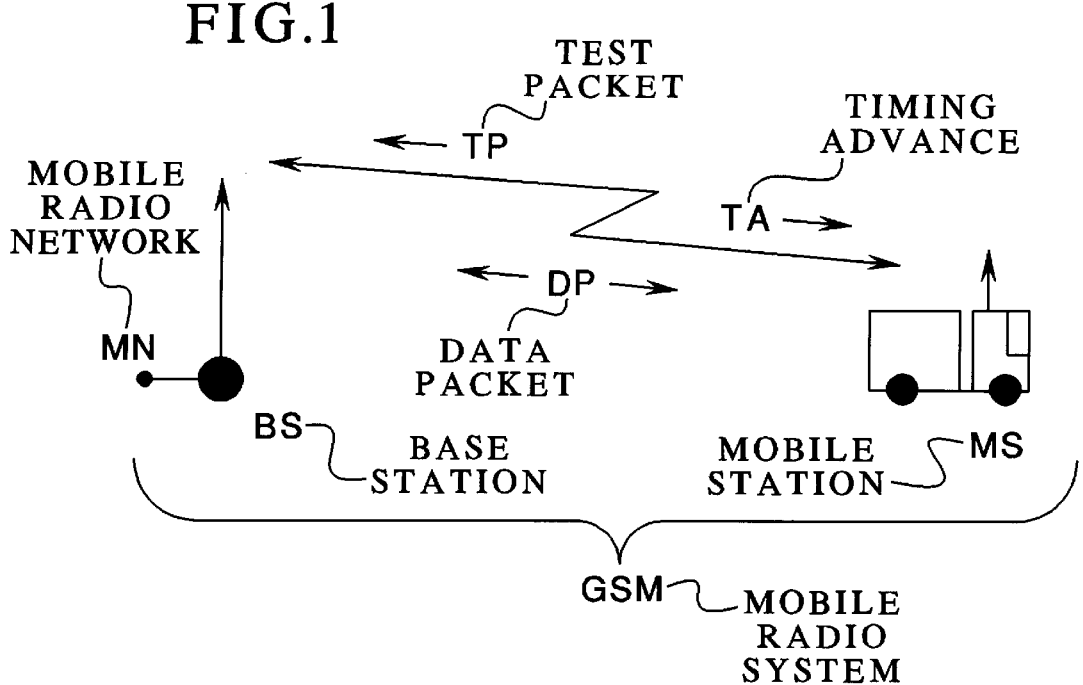
FIG. 1 shows a diagrammatic representation of the air interface between a base station and a mobile station within a mobile radio system.

In FIG. 1 shows a mobile station MS; for example, a tachograph which is fitted in a truck of a haulage company and, for sending and receiving data, is connected to the control centre of the haulage company via a base station BS. The base station BS establishes the link with the control centre of the haulage company via a mobile radio network MN. The mobile station MS, the base station BS and the mobile radio network MN are in this case part of a GSM mobile radio system GSM.

The GSM mobile radio system operates with a combination of the frequency-division multiplex method and the time-division multiplex method. Each frequency channel of the base station BS is subdivided into eight time slots ZL, which can be assigned to various mobile stations MS. The data packets DP to be sent between mobile station MS and base station BS must be matched to the time-slot pattern of the respectively receiving station. In this case, an exact matching, in conformity with the time slots, of the data packets DP to be received is necessary, especially for the reception by the base station BS, since under certain circumstances it may receive data packets DP from several mobile stations MS and these data packets DP must not collide with one another.

For this, the mobile station MS must send a data packet DP at a time of sending ST provided with a timing advance TA. This timing advance TA is determined in the base station BS, in that a test packet TP sent from the mobile station MS to the base station BS is analyzed in comparison with the timing pattern of the time slots ZL of the base station BS.

Figure 2:
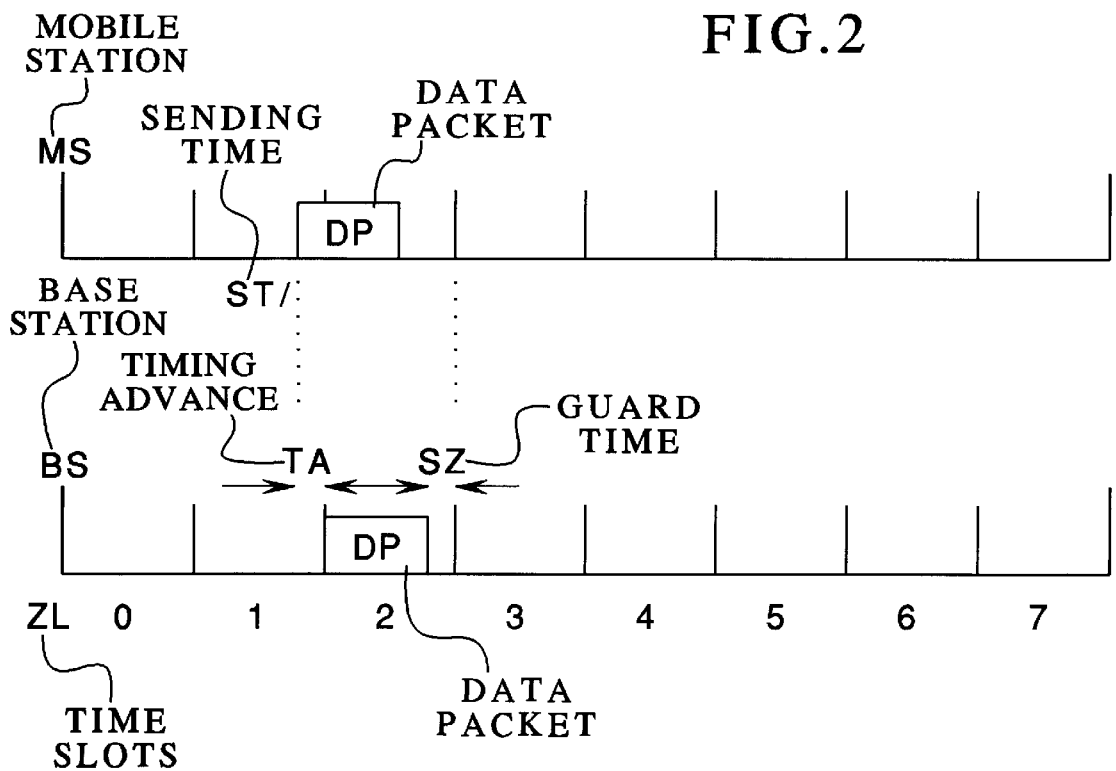
FIG. 2 shows the timing advances and guard times which are important in data packet transmission and become clear in a comparison of the time slots of a mobile station and a base station.

It becomes clear from FIG. 2 that the mobile station MS must send a data packet DP before the beginning of a time slot ZL (for example, time slot ZL 2) within the base station BS in order for, taking into account the signal delay between mobile station MS and base station BS, the data packet DP to arrive at the base station BS at the beginning of the time slot ZL. This time between time of sending ST of the mobile station MS and the beginning of the time slot ZL in the base station BS is referred to as the timing advance TA.

According to the present invention, the transmission of the data packet DP is performed with a small guard time SZ. This guard time SZ is the time between the end of the data packet DP and the beginning of the next time slot ZL (in FIG. 2, time slot ZL 3). A time slot ZL in the GSM system makes possible the transmission of a total of 156.25 bits (1 bit corresponds to approximately 3.7 $\mu$s). Further, a guard time SZ of approximately 8.25 bits, as is used for standard bursts in the GSM system, proves to be sufficient also for the transmission of data packet DP.

Figure 3:
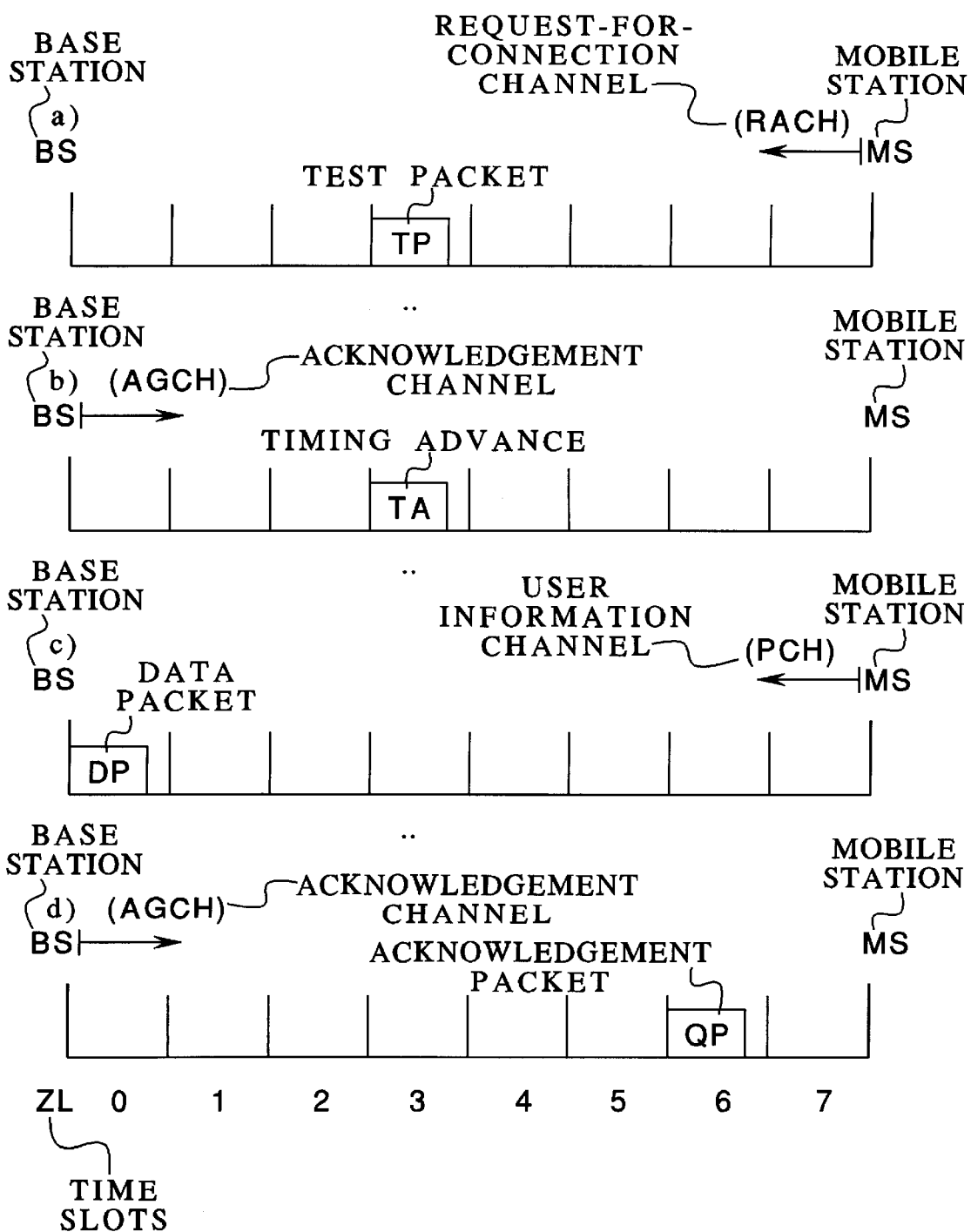
FIG. 3 shows the sequence for determining the timing advance and the transmission of the data packets as well as their acknowledgement.

The sequence of the data packet transmission with associated determination of the timing advance TA is explained with reference to FIG. 3, wherein the time slots ZL chosen for signalling are freely selectable.

A logical link between mobile station MS and base station BS has already been set up for the sending of data packets DP—not shown. This takes place, as known from connection-oriented voice or data transmission, by the logical context being established for the further data transmission. The mobile station MS is assigned an address, which in the further course of the session is integrated into the data packets DP to be transmitted and which serves for identification of the logical link.

From this time on, the mobile station MS determines the timing advance TA at regular intervals. This takes place, for example, by the mobile station MS sending a test packet TP to the base station (see FIG. 3a) on a request-for-connection channel RACH, which is also used for setting up the logical link. This test packet DP is additionally given an identification indicating only that the timing advance TA is to be determined. Consequently, the base station BS need not reserve nor assign any physical resources, i.e. any time slot ZL. The base station BS determines the timing advance TA from the time of arrival of the test packet TP and sends the value of the timing advance TA on an acknowledgement channel AGCH to the mobile station MS (see FIG. 3b).

This determination of the timing advance TA may be performed after a predetermined period or it may be carried out whenever a data packet DP is to be sent from the mobile station MS and a time value exceeding a predetermined period of time has elapsed since the last determination of the timing advance TA.

In the first case, the predetermined period may either be specifically set, for example three minutes for a base station BS in an urban area, or adaptations may be set for the type of service used by the mobile station MS (for stationary or less mobile points of sale, for example, very long periods) or the period for determining the timing advance may be fixed adaptively. At the beginning of a logical link, for example, very short period lengths are specifically set, but if the timing advance does not change or changes only scarcely, this period is extended. Also, in the second case, the predetermined period of time may be linked to similar conditions.

A data packet DP is sent from the mobile station MS to the base station BS via a user-information channel PCH for packet data transmission (see FIG. 3c). The previously determined timing advance TA is taken into account in the determination of the transmitting time ST. The base station BS acknowledges the reception of the data packet DP on the corresponding acknowledgement channel AGCH with the aid of an acknowledgement packet QP (see FIG. 3d). This acknowledgement packet QP may be used for a further transmission of a determined timing advance TA.

If the mobile system GSM is designed in such a way that the mobile stations MS are not respectively assigned a specific time slot ZL, but instead they select the time slot ZL themselves, the case may occur that two different mobile stations MS access the same time slot ZL in the same frequency channel. As a result, the base station BS would not be able to evaluate a data packet DP and would not send the acknowledgement of the data packet DP. The mobile stations MS have to resend their data packet DP in each case. In order to avoid a renewed collision, a time slot ZL is reselected on the basis of a random system within a certain period. The transmission attempt is continued until the base station BS correspondingly acknowledges the reception of the data packet DP.

Although the present invention has been described with reference to specific embodiments, those of skill in the art will recognize that changes may be made thereto without departing from the spirit and scope of the invention as set forth in the hereafter appended claims.

What is claimed is:

1. A process for transmitting data packets from mobile stations to base stations in mobile radio systems operated in a time-division multiplex method, comprising the steps of:

providing time slots in a base station which is one of said base stations;

transmitting a test packet from a mobile station which is one of said mobile stations to the base station;

receiving the test packet within the time slots of the base station;

establishing an arrival time of the test packet at the base station;

determining a timing advance from the arrival time at the base station only after certain decision criteria are satisfied wherein the criteria are related to a period of time between timing advance determinations;

sending the timing advance from the base station to the mobile station;

establishing a data packet transmitting time based on the timing advance; and sending a data packet at the transmitting time from the mobile station to the base station in conformity with the time slots wherein the sending of the data packet is performed with a guard time which is less than a maximum permissible signal delay between the mobile station and the base station.

2. The process as claimed in claim 1, wherein the decision criteria are satisfied by an end of a period which can be set by means of parameters.

3. The process as claimed in claim 1, wherein the decision criteria are satisfied by the fact that, upon the step of sending the data packet, a last determination of the timing advance was a predetermined period of time before.

4. The process as claimed in claim 1, further comprising the step of:

providing the test packet with identification which indicates that the timing advance is to be determined.

5. The process as claimed in claim 1, wherein the guard time is 10 to 50 $\mu$s.

6. The process as claimed in claim 1, wherein the mobile radio systems are configured with the features of a GSM mobile radio system.

7. The process as claimed in claim 6, further comprising the step of:

confirming reception of the timing advance on an existing acknowledgment channel.

8. The process as claimed in claim 6, wherein the transmission of the test packet from the mobile station to the base station occurs on an existing request-for-connection channel.

* * * * *